United States Patent [19]

Bossomaier et al.

[11] 4,246,485

[45] Jan. 20, 1981

[54] X-RAY INTENSIFYING SCREENS

[75] Inventors: Terence R. J. Bossomaier, Brentwood; Peter C. Sangway, Croydon, both of England

[73] Assignee: Ciba-Geigy Aktiengesellschaft, Basel, Switzerland

[21] Appl. No.: 18,703

[22] Filed: Mar. 8, 1979

[30] Foreign Application Priority Data

Mar. 22, 1978 [GB] United Kingdom ............... 11296/78

[51] Int. Cl.$^3$ ..................... G01J 1/58; G01N 21/52; C09K 11/46
[52] U.S. Cl. ................................. 250/486; 250/483; 252/301.18; 252/301.4 H; 252/301.4 R
[58] Field of Search ............ 252/301.18, 301.36, 252/301.4 H; 250/483, 486

[56] References Cited

U.S. PATENT DOCUMENTS

| | | | |
|---|---|---|---|
| 2,819,183 | 1/1958 | Alles | 428/215 |
| 3,300,311 | 1/1967 | Kennard et al. | 252/301.36 X |
| 3,936,644 | 2/1976 | Rabatin | 250/486 |
| 4,054,798 | 10/1977 | Watanaba et al. | 250/483 |
| 4,070,583 | 1/1978 | Rabatin | 250/483 |
| 4,138,361 | 2/1979 | Suys et al. | 252/301.33 |

Primary Examiner—F. C. Edmundson
Attorney, Agent, or Firm—Sprung, Felfe, Horn, Lynch & Kramer

[57] ABSTRACT

Phosphor screens for converting X-rays to visible or near visible radiation are provided. These screens comprise in a fluorescent layer at least one lanthanum-, gadolinium or mixed lanthanum-gadolinium-oxy-halide phosphor, a binder for the phosphor and as stabilizer for the phosphor an epoxy compound. The oxy-halide phosphor corresponds to the formulae La OX:RE,
Gd OX:RE or
Gd La OX:RE, wherein X is halide and RE is rare earth activator.

17 Claims, No Drawings

X-RAY INTENSIFYING SCREENS

This invention relates to phosphor screens for converting X-rays to visible or near visible radiation.

Screens which convert X-rays to visible or near visible radiation are of particular use in radiography in which patients are exposed to X-radiation which is then converted to light by a phosphor intensifying screen. The light emitted by the screen exposes an X-ray film which yields after development an X-ray picture of the exposed portion of the patient. In recent years it has been realised that patients should be exposed to as little X-radiation as possible because exposure to X-rays can cause organic damage in the tissues of the patient.

Recently great use has been made of new lanthanum-oxy-halide phosphors in X-ray intensifying screens. These phosphors are more efficient than calcium tungstate which has been used in X-ray intensifying screens since 1896 and the use of such screens enables the exposure of the patient to X-rays to be considerably reduced. However it has been discovered that screens containing lanthanum-oxy-halide phosphors tend to discolour rapidly when in use and in particular when held in contact with an X-ray film, as often occurs in hospitals who like to keep their cassettes charged with unexposed film, ready for use.

Gadolinium-oxy-halides are similar to lanthanum-oxy-halides and whilst not much use has been made of these phosphors trials have shown that these phosphors offer much the same advantages as lanthanum-oxy-halide but also exhibit the same disadvantages.

In spite of intensive research into this discolouration defect the cause of it is not yet clearly known but it appears to be a complex reaction caused, in part at least, by the hygroscopic nature of the lanthanum-oxy-halide phosphors or gadolinium-oxy-halide phosphors, the nature of the binder and the presence of the X-ray film held in contact with the screen for a period of time. Such discolouration of screens containing these phosphors can reduce their effective speed to a quarter of the original speed and thus their advantage is lost.

Furthermore, under somewhat different conditions of use X-ray screens and in particular X-ray screens which contain lanthanun-oxy-halide or gadolinium-oxy-halide phosphors can lose speed due to a different defect which appears to involve only the phosphor. This is hydrolysis of the phosphor which is caused by water present in the phosphor layer due either to atmospheric moisture or aqueous cleaning fluid penetrating the protective layer of the screen. It is thought that quantities of halide or more surprisingly, the free halogen, released by hydrolysis may actually catalyse the discolouration of the binder or of compounds having migrated from the film.

However we have discovered a class of compounds which act to stabilise X-ray intensifying screens comprising lanthanum-oxy-halide phosphors or gadolinium-oxy-halide phosphors against discolouration and also against hydrolysis of the phosphor.

According to the present invention there is provided an X-ray intensifying screen which comprises in a fluorescent layer at least one lanthanum-oxy-halide phosphor of the general formula $$La\ O\ X{:}RE \tag{1}$$

where X is a halogen or mixture of halogens including Cl, Br, F, I and RE is a rare earth activator or a mixture of rare earth activators and/or at least one gadolinium-oxy-halide of the general formula $$Gd\ O\ X{:}RE \tag{2}$$

where X and RE are as defined above and/or a mixed lanthanum gadolinium-oxy-halide of the general formula $$Gd\ La\ OX{:}RE \tag{3}$$

where X and RE are as defined above, a binder, the phosphor or phosphors and as a stabiliser for the phosphor or phosphors a compound which has at least one free epoxy group.

Preferably in each formula X is bromine or chlorine.

Examples of suitable rare earth activating agents are thullium, ytterbium, terbium and cerium.

Examples of specific gadolinium-and-lanthanum-oxy-halides are:

$$La_{(0.998)}OBr{:}Tm_{(0.002)} \tag{4}$$

$$La_{(0.999)}OBr{:}Tb_{(0.0008)}Yb_{(0.0002)} \tag{5}$$

$$Gd_{(0.998)}OCl{:}Tm_{(0.002)} \tag{6}$$

Other phosphors may also be present in the fluorescent layer for example barium fluoro-chloride, barium strontium sulphate and calcium tungstate.

It is important that the stabiliser comprises free epoxy groups and does not cross-link with the binder thus losing its free epoxy groups.

Suitable binders for the phosphor are cellulose esters for example cellulose acetate, cellulose triacetate, cellulose acetate butyrate, cellulose nitrate, polyvinyl compounds for example polyvinyl chloride and polyvinyl butyral and copolymers of vinyl compounds, solvent-soluble polyesters and polycarbonates. Preferably acrylate and methacrylate compounds for example homo or co-polymers of ethyl acrylate, butyl acrylate, butyl methacrylate and methyl methacrylate are used as the binder.

Preferably as a high proportion of phosphor to binder as possible should be present in the fluorescent layer while ensuring that the fluorescent layer has adequate strength and does not crack after some usage. Suitably the proportion of phosphor to binder used in the fluorescent layer is from 40 phosphor to 1 of binder to 4 of phosphor to 1 of binder, the ratios being by weight.

Many types of epoxy compounds can be used as the stabilising agent but preferably non-polymeric epoxy compounds are used. Most preferably the epoxy compounds should be non-volatile and soluble in organic solvents, such as ketone, aliphatic esters and aromatic hydrocarbons, to enable them to be incorporated in the fluorescent layer. Examples of suitable solvents are acetone, methylethylketone, ethylacetate, benzene or toluene.

Epoxy compounds, i.e. substances containing at least one 1,2-epoxide group per average molecule, suitable for use in the present invention are preferably those containing groups of the formula

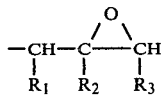

(7)

directly attached to atoms of oxygen, nitrogen, or sulphur, wherein either $R_1$ and $R_3$ each are hydrogen, in which case $R_2$ is hydrogen or methyl, or $R_1$ and $R_3$ together are —$CH_2CH_2$—, in which case $R_2$ is hydrogen.

As examples of such compounds may be mentioned polyglycidyl and poly($\beta$-methylglycidyl) esters obtainable by reaction of a compound containing two or more carboxylic acid groups per molecule with epichlorohydrin, glycerol dichlorohydrin, or $\beta$-methylepichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahdrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly($\beta$-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene)-glycols, propane-1,3-diol, butane-1,4-diol, poly(oxytetramethylene)glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis-(2-hydroxyethyl) aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)-methane (otherwise known as bisphenol F), 4,4'-dihydroxydiphenyl, bis(4-hydroxyphenyl)sulphone, 1,1,2,2-tetrakis(4-hydroxyphenyl)ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert-butylphenol.

Poly(N-glycidyl) compounds include, for example, the derivatives of amines such as aniline, n-butylamine, bis(4-aminophenyl)methane, and bis(4-methylaminophenyl)methane; triglycidyl isocyanurate; and N,N' diglycidyl derivatives of cyclic alkylene ureas, such as ethyleneurea and 1,3-propyleneureas, and of hydantoins such as 5,5-dimethylhydantoin.

Examples of poly(S-glycidyl) compounds are di(S-glycidyl) derivatives of dithiols such as ethane-1,2-dithiol and bis(4-mercaptomethylphenyl) ether.

Examples of epoxides having groups of formula (7) where $R_1$ and $R_3$ conjointly denote a —$CH_2CH_2$— group are bis(2,3-epoxycyclopentyl) ether, 2,3-epoxycyclopentyl glycidyl ether, and 1,2-bis(2,3-epoxycyclopentyloxy)ethane.

Epoxides having the 1,2-epoxide groups attached to different kinds of hetero atoms be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Epoxide compounds in which some or all of the epoxide groups are not terminal may also be employed, such as vinylcyclohexene dioxide, limonene dioxide, dicyclopentadiene dioxide, 4-oxatetracyclo[6.2.1.0$^{2,7}$.0.$^{3,5}$]-undec-9-yl glycidyl ether, the bis (4-oxatetracyclo[6.2.0$^{2,7}$.0$^{3,5}$]undec-9-yl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, 3-(3,4-epoxycyclohexyl)-8,9-epoxy-2,4-dioxaspiro[5,5]undecane, and epoxidised butadienes or copolymers of butadiene with ethylenic compounds such as styrene and vinyl acetate.

If desired, a mixture of epoxide compounds may be used. Especially preferred epoxide resins, used as substizer of the present X-ray intensifying screens are a glycidyl bisphenol, a glycidyl isocyanurate, a glycidyl silane or an epoxidised soya bean oil.

Examples of suitable epoxy compounds are glycidyl bisphenol compounds for example the compound of formula

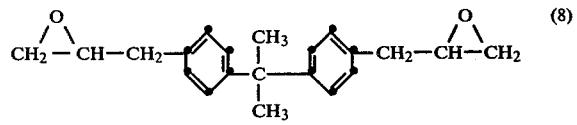

(8)

Both phenyl rings may be further substituted by halogen, alkyl with 1 to 4 carbom atoms or alkenyl with 2 to 4 carbon atoms. Unsubstituted phenyl rings are preferred.

Other suitable epoxy compounds are glycidyl isocyanurates for example the compound of formula

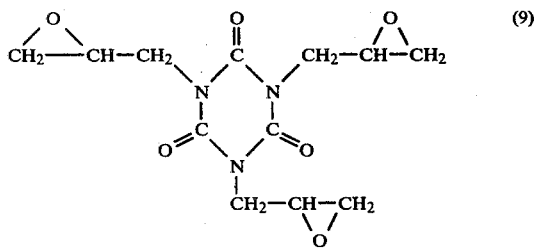

(9)

Other epoxy compounds which also help to plasticise the layer are of use for example epoxidised soya bean oil which is commercially available.

A particularly suitable class of epoxy compounds are epoxy silanes. An example of an epoxy silane is $\gamma$-glycidoxy trimethoxy silane which has the formula

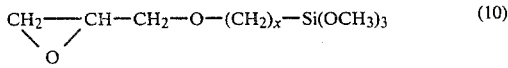

$x = 2$ to 6, preferably 3

Epoxy silanes are of particular use as they can be reacted with the surface of the phosphor in the presence of moisture. In effect the silane functional group bonds to the surface of the phophor leaving the free epoxy groups close to the surface of the phosphor.

X-ray intensifying screens usually comprise a self-supporting support base there being present thereon in order, a light reflecting layer or light absorbing layer (optional), a fluorescent layer and a protective layer. The light-reflecting layer (if present) usually comprises particles of a light reflecting substance e.g. barium oxide, calcium carbonate, magnesium carbonate, magnesium oxide or titanium dioxide in a polymeric binder. Alternatively a light reflecting support base containing for example one or more of the just-mentioned light-reflecting pigments may be used or the base may be a voided base containing many trapped air cavities, such bases being highly reflective. The light-absorbing layer if present usually comprises carbon black particles in a binder. In order to protect the surface of the fluorescent layer a protective layer which is usually a transparent polymeric substance is coated onto the fluorescent layer. If the self-supporting support used is transparent for instance if polyester is used it is not necessary for a light reflecting layer to be present between the base support and the fluorescent layer. In this case the light reflective layer (if used) may be present on the side of the base support distal to the fluorescent layer or separate light reflecting means may be used in conjunction with the intensifying screen.

In the X-ray intensifying screen of the present invention the fluorescent layer may comprise particles of a single phosphor or a mixture of phosphors.

The X-ray intensifying screen of the present invention may be prepared by dispersing the phosphor particles in a solution of a suitable binder. The phosphor dispersion is then coated on a suitable stable base and dried. The protective layer may then be coated on the dried phosphor layer.

A suitable coating weight of the phosphor or mixed phosphors in the fluorescent layer if from 2.20 g/dm². The prepared amount of epoxy compound in the fluorescent layer is from 0.1 to 1.5% by weight of the coating weight of phosphor and most preferably from 0.3 to 1.2%.

Suitable base materials are card, cellulose esters, for example cellulose triacetate, polyesters, for example polyethylene terephthalate and in particular so-called voided polyester as described in GB Pat. No. 1'415'686 and white pigmented polyester or cellulose triacetate.

Suitable reflective layers, which may be present between the usually opaque base and the fluorescent layer, are a layer containing titanium dioxide (or the other white pigments just mentioned) or a metallic layer for example a thin film of aluminium or silver evaporated on to the base.

The protective layer may be of any of the usual polymeric compounds employed for this purpose for example cellulose acetate, cellulose nitrate or polymethyl methacrylate.

There may be present in the fluorescent layer a plasticiser for example triphenyl phosphate, tricresyl phosphate, dialkyl phthalates, dimethyl glycol phthalate alkyl adipates and polyester plasticisers. Also epoxidised soya bean oil may be used as a plasticiser as well as a stabiliser.

Another class of stabiliser which may be present in the fluorescent layer of the X-ray intensifying screen of the present invention is dialkyl tin compound for example dibutyl tin dioctyl (thioglycollate).

There may be present in at least one of the phosphor layers, protective layers or light-reflecting layers acutance dyes or pigments which help to increase the sharpness of the image.

It is to be understood that a light-reflecting layer which comprises light reflective particles in a polymeric binder may be cast first on to the dimensionally stable support before the fluorescent layer is case on to this support. If the base support is transparent the fluorescent layer may be coated on to the other side of the support to the light reflecting layer. The preferred base is polyester and it is usually required that the polyester base is comparatively thick compared with a base used for photographic purposes that is to say the base used should have a thickness in the region of 0.02 to 0.04 cm, e.g. 0.025 cm.

The medical X-ray films used in the examples comprise a subbed polyethylene terephthalate base coated on each side with a layer of a gelatino silver iodobromide emulsion containing 1.6% iodine and having a silver coating weight of 38 mg/dm² and a gelatin coating weight of 40 mg/dm² on each side and also a gelatin supercoat having a coating weight of 12 mg/dm² on each emulsion layer. The silver halide crystals were heterodispersed polyhedral in habit.

The X-ray films used in the examples also contain the usual addenda such as sensitising agents, stabilising agents, polyethylene oxide compounds and optical sensitising dyes.

EXAMPLE 1

Preparation of stabilised screen, A 100 g of a thulium activated lanthanum oxybromide phosphor, 5 g of cellulose acetate polymer and 0.3 g of the epoxy compound, monomeric diglycidyl ether of bis-phenol A are dispersed in 25 g of acetone, 4.5 g of ethyl acetate and 4.0 g of dimethyl phthalate. The suspension of phosphor particles in the organic solution of the polymeric binders and other additives is then milled in a ball-mill for 24 hours to achieve adequate dispersion of the phosphor. The dispersion is coated on to a subbed polyethylene terephthalate support layer and dried thoroughly to produce a coated weight of 500/m².

A 15% solution by weight of cellulose acetate in acetone is applied to this phosphor layer and dried thoroughly to produce a 25 μm thick continuous layer which protects the phosphor layer.

Preparation of unstabilised control screen, B

Screen B is prepared exactly as screen A except that the epoxy compound is omitted from the formulation of the coating solution.

Test of stability to prolonged contact with film—test I
(discolouration test)

Screen A and screen B are placed together in a radiographic cassette with a sheet of a medical X-ray film in contact equally with screen A and screen B and the cassette is closed. The cassette used is of any type intended for containing intensifying screens and film in a light-tight container during exposure to X-rays and had been shown to withstand the conditions involved in this test without itself producing adverse effects on any intensifying screen contained within the cassette.

The cassette containing screens A and B in contact with the medical X-ray film is then placed within an incubator at a temperature of 52° C. and at a relative humidity of 66%. These conditions are maintained for twenty-one days but the X-ray film was changed for a new one every day. The following test for loss of radiographic sensitivity or speed was carried out every seven days.

Radiographic speed measurement

After incubation in contact with an X-ray film, screens A and B are removed from the incubation cassette and allowed to equilibrate to ambient conditions. The treated screens A and B are tested together with an untreated control screen C which has been produced identically to screen B but has not been incubated or kept in contact with X-ray film. Screens A, B and C are placed in contact with a medical X-ray film and are irradiated with X-rays to produce a uniform fluorescent light exposure of the film by each screen in area it covers. The duration and intensity of the irradiation is adjusted to produce an optical transmission density $(D_C)$ to visible light of 1.6 to 2.0 above fog for the area of the medical X-ray film in contact with screen C when the film has been developed and fixed in the recommended manner to produce a known contrast G in the region of density 1.0 to 2.0 above fog.

The transmission densities of the film areas exposed to screens A and B are also measured ($D_A$ and $D_B$). The loss of radiographic sensitivity ($\Delta S$) of the screens is then calculated as follows with negative figures indicating a speed loss, $$\Delta S_A = \frac{(D_A - D_C)}{G}, \quad \Delta S_B = \frac{(D_B + D_C)}{G}$$

This parameter is equal to the $\log_{10}$ (change in fluorescent emission).

| Radiographic speed losses after | Incubation time(days) | | | Visual appearance after 21d treatment |
|---|---|---|---|---|
| | 7 | 14 | 21 | |
| $\Delta S_A$ | −0.05 | −0.10 | −0.17 | slightly stained, off-white |
| $\Delta S_B$ | −0.14 | −0.29 | −0.49 | heavily stained, light brown |

EXAMPLE 2

Preparation of stabilised screen, E 100 g of thulium activated lanthanum oxybromide phosphor, 18 g of a 23% by weight solution of cellulose nitrate in acetone, 4.2 g of dibutyl phthalate 0.3 g of epoxy compound monomeric diglycidyl ether of bisphenol A are milled together in a ball-mill for eight hours, A further 16 g acetone, 5 g ethyl acetate and 2 g ethyl lactate are added and the mixture is milled for a further sixteen hours to achieve adequate dispersion of the phosphor in the binder solution.

This dispersion is coated on to a subbed polyethylene terephthalate substrate and dried thoroughly to produce a coated weight of 500 g/m².

A 15% solution by weight of cellulose acetate in acetone is applied to this phosphor layer and dried thoroughly to produce 25 μm thick continuous layer which protects the phosphor layer Preparation of unstabilised control screen, F Screen F is prepared exactly as screen E except that the epoxy compound omitted from the formulation of the coating solution.

Test of stability to prolonged contact with film—Test I (discolouration test)

The test described for Example 1 is carried out for screens E and F in the same manner as for A and B.

Radiographic speed measurement

The treated screens E and F are compared with an untreated control screen H in which has been produced indentically to F but has not been incubated or kept with film. The test is carried out in the same manner as the comparison of the radiographic speed of treated screens A and B to screen C as described in Example 1.

| Radiographic speed losses after | Incubation time (days) | | | Visual appearance after 21d treatment |
|---|---|---|---|---|
| | 7 | 14 | 21 | |
| $S_E$ | −0.11 | −0.18 | −0.24 | stained, pale yellow |
| $S_F$ | −0.13 | −0.23 | −0.30 | stained, light straw colour |

EXAMPLE 3

Preparation of stabilised screen, J 100 g of thulium activated lanthanum oxybromide, 0.3 g of the epoxy compound tri-N-glycidyl isocyanurate, 28 g of a 30% by weight solution of a copolymer of butyl methacrylate and methyl methacrylate (10:1 parts by weight) in acetone are milled together in a ball-mill for eight hours. A further 18 g of acetone is then added and the mixture milled for 16 hours to achieve adequate dispersion and complete dissolution of the stabiliser. The dispersion is coated on to a subbed polyethylene terephthalate support layer and is dried thoroughly to give coatings of 500 g/m² layer weight.

A 15% solution by weight of cellulose acetate in acetone is applied to this phosphor layer and dried thoroughly to produce a 25 μm thick continuous layer which protects the phosphor layer.

Preparation of unstabilised control screen, K

Screen K is prepared in an identical manner to screen J except that the epoxy compound is omitted from the formulaton of the coating dispersion.

Test of stability to contact with film—test I (discolouration test)

The screens J and K are subjected to the same test I as is outlined for screen A and B in Example I.

Test of stability to moisture—test II (phosphor hydrolysis test)

Screens $J^1$ and $K^1$ prepared identically to J and K are placed together in an air-circulating temperature and humidity controlled oven which is set at 60° C. and 95% relative humidity. The samples are tested for loss of radiographic sensitivity or speed every seven days.

Radiographic speed measurement

Screens, J, K, J¹ and K¹ are removed from their respective test conditions and are allowed to equilibrate to ambient conditions. The loss of radiographic sensitivity or speed of each screen relative to screen L is determined as in Example 1.

| Loss of Radiographic Sensitivity after | Incubation time - Test I | | | | | Visual appearance after 35d |
|---|---|---|---|---|---|---|
|  | 7d | 14d | 21d | 28d | 35d |  |
| $\Delta S_J$ | 0 | −0.04 | −0.06 | −0.17 | −0.26 | pale yellow |
| $\Delta S_K$ | −0.02 | −0.05 | −0.26 | −0.43 | −0.52 | light brown |

| Loss of Radiographic Sensitivity after | Incubation time - Test II | | | | |
|---|---|---|---|---|---|
|  | 7d | 14d | 21d | 28d | 35d |
| $\Delta S_{J^1}$ | 0 | −0.04 | 0 | −0.04 | −0.04 |
| $\Delta S_{K^1}$ | 0 | 0 | 0 | > −1.5 | > −1.5 |

EXAMPLE 4

Preparation of stabilised screen, M 100 g of thulium activated lanthanum oxybromide, is conditioned at room temperature and 80% relative humidity for 5 hours. A solution of 0.3 g epoxy compound γ-glycidoxypropyl-trimethoxysilane dissolved in 25 g of acetone is added and the suspension of phosphor is refluxed for 1 hour before distilling off the acetone from the phosphor under reduced pressure. This procedure causes the stabiliser to become absorbed to and in part chemically reacted with the surface.

28 g of a 30% by weight solution of a copolymer of butyl methacrylate and methyl methacrylate (10:1 parts by weight) in acetone is milled in a ball-mill together with the treated phosphor for 8 hours. A further 18 g of acetone is then added and the mixture milled for a further 16 hours to achieve adequate dispersion. The dispersion is coated on to a subbed polyethylene terephthalate support layer and is dried thoroughly to give coatings of 500 g/m² layer weight.

A 15% solution by weight of cellulose acetate in acetone is applied to this phosphor layer and dried thoroughly to produce a 25 μm thick continuous layer which protects the phosphor layer.

Preparation of unstabilised control screen, N

Screen N is prepared in an identical manner to screen M except that the stabiliser treatment is not applied to the phosphor and no further stabiliser addition is made to the formulation.

Test of stability to contact with film—test I (discolouration test)

The screen M and N are subjected to the same test 1 as is outlined for screen A and B in Example 1.

Test of stability to moisture—test II (phosphor hydrolysis test)

Screens M¹ and N¹ prepared identically to M and N are subjected to the same test II as is outlined for screens J¹ and K¹ in Example 3.

Radiographic speed measurement

Screens M, N, M¹ and N¹ are removed from their respective test conditions and are allowed to equilibrate to ambient conditions. The screens are tested as described in Example 1 by comparison with screen P which has been prepared in the same manner as screens N and N¹ but which has not been exposed to either of the test conditions. The loss of radiographic sensitivity or speed or each screen relative to screen P is determined as in Example 1.

| Loss of Radiographic Sensitivity after | Incubation time - Test I | | | | | Visual Appearance after 35d |
|---|---|---|---|---|---|---|
|  | 7d | 14d | 21d | 28d | 35d |  |
| $\Delta S_M$ | 0 | −0.03 | −0.10 | −0.19 | −0.26 | light yellow |
| $\Delta S_N$ | −0.02 | −0.05 | −0.26 | −0.43 | −0.52 | brownish |

| Loss of Radiographic Sensitivity after | Incubation time - Test II | | | | |
|---|---|---|---|---|---|
|  | 7d | 14d | 21d | 28d | 35d |
| $\Delta S_{M^1}$ | 0 | 0 | 0 | −0.01 | −0.06 |
| $\Delta S_{N^1}$ | 0 | 0 | 0 | > −1.5 | > −1.5 |

These Examples show that epoxy compounds serve to stabilise X-ray screens of the present invention against discolouration and against hydrolysis of the phosphor.

We claim:

1. An X-ray intensifying screen which comprises in a fluorescent layer a phosphor selected from the group consisting of (1) a lanthanum-oxy-halide phosphor of the general formula La OX:RE, (2) a gadolinium-oxy-halide of the general formula Gd OX:RE, (3) a mixed lanthanum-gadolinium-oxy-halide of the general formula Gd La OX : RE, and (4) a combination of at least two of said phosphors (1), (2) and (3), where X is a halide and RE is a rare earth activator, a binder for the phosphor or phosphors and as a stabiliser for the phosphor or a compound which comprises at least one free epoxy group.

2. An X-ray intensifying screen according to claim 1 in which the epoxy compound is a non-volatile compound which is soluble in organic solvents.

3. An X-ray intensifying screen according to claim 1 in which the epoxy compound contains at least one 1,2-epoxide group of the formula

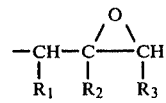

directly attached to atoms of oxygen, nitrogen, or sulphur, wherein either $R_1$ and $R_3$ each are hydrogen, in which case $R_2$ is hydrogen or methyl, or $R_1$ and $R_3$ together are -$CH_2CH_2$-, in which case $R_2$ is hydrogen.

4. An X-ray intensifying screen according to claim 1 in which the epoxy compound is a glycidyl bisphenol compound, a glycidyl isocyanurate, an epoxidised soya bean oil or a glycidyl silane.

5. An X-ray intensifying screen according to claim 4 in which the glycidyl bisphenol resin is the compound of the formula

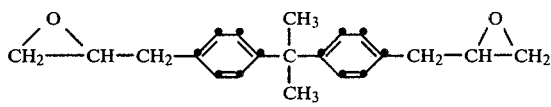

6. An X-ray intensifying screen according to claim 4 in which the glycidyl isocyanurate is the compound of the formula

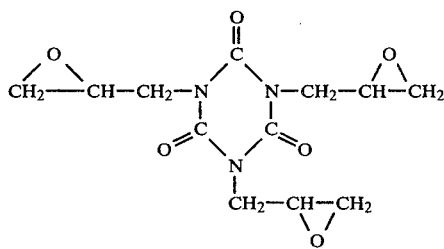

7. An X-ray intensifying screen according to claim 4 in which the epoxy compound is an epoxidised soya bean oil.

8. An X-ray intensifying screen according to claim 1 in which the epoxy compound is an epoxy silane.

9. An X-ray intensifying screen according to claim 8 in which the epoxy silane is γ-glycidoxy trimethoxy silane.

10. An X-ray intensifying screen according to claim 1 in which the coating weight of the phosphor or mixed phosphors in the fluorescent layer is from 2 to 20 g/dm$^2$.

11. An X-ray intensifying screen according to claim 10 in which the amount of epoxy compound present in the fluorescent layer is from 0.1 to 1.5% by weight of the coating weight of the phosphor.

12. An X-ray intensifying screen according to claim 11 in which the amount of epoxy compound present is from 0.3 to 1.2% by weight of the phosphor coating weight.

13. An X-ray intensifying screen according to claim 1 which also comprises in the fluorescent layer a plasticiser.

14. An X-ray intensifying screen according to claim 13 in which the plasticiser is triphenyl phosphate, tricresyl phosphate, a dialkyl polyester plasticiser or a dialkyl phthalate.

15. An X-ray intensifying screen according to claim 1 which also comprises in the fluorescent layer a dialkyl tin compound.

16. An X-ray intensifying screen according to claim 15 in which the dialkyl tin compound is dibutyl tin dioctyl (thioglycollate).

17. An X-ray intensifying screen according to claim 1 which comprises a self-supporting base, optionally a light-reflecting or light-absorbing layer, a fluorescent layer and a protective layer.

* * * * *

UNITED STATES PATENT AND TRADEMARK OFFICE
CERTIFICATE OF CORRECTION

PATENT NO. : 4,246,485
DATED : January 20, 1981
INVENTOR(S) : Terence R.J. Bossomaier et al It is certified that error appears in the above—identified patent and that said Letters Patent is hereby corrected as shown below:

Column 5, line 22, "many" not "may".

Column 10, line 53 "phosphors" omitted after "or".

Signed and Sealed this

Twenty-eighth Day of April 1981

[SEAL]

Attest:

RENE D. TEGTMEYER

Attesting Officer     Acting Commissioner of Patents and Trademarks